3,394,111
PROCESS FOR THE POLYMERIZATION OF URETDIONES USING ALIPHATIC TERTIARY PHOSPHINE CATALYSTS
Dietrich Liebsch, Leverkusen, Germany, assignor to Farbenfabriken Bayer Aktiengesellschaft, Leverkusen, Germany, a German corporation
No Drawing. Filed Apr. 10, 1964, Ser. No. 358,929
Claims priority, application Germany, Apr. 11, 1963, F 39,463
5 Claims. (Cl. 260—77.5)

ABSTRACT OF THE DISCLOSURE

Polyisocyanurates are prepared by treating 3,3'-diisocyanato-4,4'-dimethyldiphenyl uretdione as essentially the sole starting reactant with a catalytic amount of an aliphatic tertiary phosphine catalyst at a temperature below about 150° C.

---

This invention relates to a process for the preparation of organic diisocyanate polymers which are derivatives of isocyanuric acid and have free NCO groups, but which contain only traces of the monomer.

Heretofore it has been known in the preparation of high molecular weight compounds to use basic catalysts to permit the polymerization of the isocyanate groups. It is further known that when tertiary amines and tertiary phosphines are used as catalysts, trimerization to derivatives of isocyanuric acid is favored. The products thus obtained, however, are of limited importance as raw materials for lacquers and adhesives as long as the monomer is present in considerable quantities with the trimer, rendering it substantially useless due to the highly volatile nature of the monomer and its toxic properties.

It is further known that during the trimerization reaction some dimeric isocyanate is formed in the presence of the catalyst. The dimers, however, are in an equilibrium with the monomeric forms at elevated temperature, in contrast to the trimers which are heat-stable. It has therefore already been proposed to start from a dimeric monoisocyanate to produce the trimer under the influence of heat and catalyst. Under these reaction conditions the dimer is split into the monomer, in other words, the equilibrium is shifted to the monomeric side, which monomer is trimerised and thereby taken from the equilibrium. The reaction proceeds until all of the dimeric monoisocyanate is split into the monomeric monoisocyante, which, in turn is trimerized to the heat-stable derivative of isocyanuric acid. If somebody tries to trimerize a diisocyanate starting from its dimeric form he could not avoid the appearance of some monomer for the above reasons unless he continues the trimerization procedure until the last NCO group has been involved in the formation of isocyanuric rings. Of high technical interest, however, are those polymers derived from diisocyanates which still have free NCO groups, but nevertheless are free from monomers. Heretofore, it has not been possible to fulfill these requirements at the same time.

It is therefore an object of this invention to provide a process for preparing high molecular weight diisocyanate polymers having free NCO groups which are devoid of the foregoing disadvantages.

A further object is to prepare high molecular weight polymers substantially free of the volatile monomer which require no further purification.

A still further object of this invention is to provide a method for the preparation of high molecular weight polymers suitable for use in manufacturing lacquers, elastomers, foams and adhesives.

These and other objects which still become apparent from the following description are accomplished in accordance with the present invention, generally speaking, by providing a process for the preparation of high molecular weight polymers with free NCO groups by the polymerization of dimers of monomeric aromatic diisocyanates wherein the high molecular weight polymers contain only traces of the volatile monomer. In the process of this invention dimers or in other words uretdiones are polymerized with the aid of tertiary aliphatic phosphines. The uretdiones are partially split up so that volatile monomeric diisocyanates are present in the reaction mixture, however, the amount of monomer present is of such a low concentration that, with the exception of very small residues, all of the monomer is incorporated into the high molecular weight polymers by a cyanuric structure as the polymerization proceeds. Therefore, the procedure can be interrupted at any time to secure polymers with free NCO groups in the desired amount without fear to have too high a content of unreacted monomer present in the reaction mixture, or in other words, the process need not continue until all NCO groups are trimerized in order to avoid undesired amounts of unreacted monomers. The products of the process require no further purification by distillation or extraction since the volatile monomer is present in such small quantities that the MAK-value cannot be exceeded when one works with these products, even in the presence of a small amount of air.

Any suitable dimeric aromatic diisocyanate having the uretdione structure may be used as the starting material for the purposes of this invention. Some examples of such suitable dimers are those obtained from toluylene-2,4-diisocyanate, 1-chloro-phenylene-2,4-diisocyanate, 1-methylphenylene-2,5-diisocyanate, 1-ethyl-phenylene-2,4-diisocyanate, 1-ethoxy-phenylene-2,4-diisocyanate, 1-isopropylphenylene-2,4-diisocyanate, 1-isopropoxy-phenylene-2,4-diisocyanate and 1-isobutoxy-phenylene-2,4-diisocyanate.

Further, in addition to homogeneous uretdiones prepared from the above enumerated diisocyanates, those which are prepared from two different aromatic diisocyanates as well as mixtures of different uretdiones may be used as the starting materials. However, since the monomeric diisocyanates from which the dimer is prepared have a high vapor pressure, it is advantageous that the uretdione be substantially insoluble in a suitable solvent for the monomer so that a dimer substantially free from monomers can be obtained without further purification.

In order to effectuate the polymerization of the dimer or uretdione, aliphatic phosphines are used. Examples are trimethylphosphine, triethyl phosphine, tripropyl phosphine, triisopropyl phosphine, tributyl phosphine, triisobutyl phosphine, tri-tert.butyl phosphine as well as mixed phosphines such as methyl diethyl phosphine, ethyl-ditert.butyl phosphine or diethyl butyl phosphine.

Tertiary phosphines of the aliphatic series are active, even at room temperature, and are much more suitable for splitting the uretdione ring and starting the reaction than are the tertiary amines. This splitting reaction is more dependent upon temperature than is the trimerization reaction, and at high temperatures (above 100°) it proceeds rapidly that products having a high content of volatile monomeric diisocyanate are obtained. At low temperatures, however, the splitting reaction proceeds so slowly that the monomer produced is used up in the polymerization reaction which takes place concurrently. The concentration of the monomer therefore remains low and the tertiary aliphatic phosphines enumerated herein are preferably used for that reason.

Tertiary phosphines of the aromatic series as well as phosphine oxides favour the splitting reaction, particularly at high temperatures, while the speed of trimerization remains low. When such catalysts are used alone, therefore, the products of the process will generally contain unwanted proportions of monomers. Conversely, tertiary amines generally do not attack the uretdione ring to any significant extent until higher temperatures are reached, whereas the polymerisation reaction may be very vigorous when the strongly basic representatives of this class of compounds are used. It is therefore advantageous to use mixtures of catalysts.

The two reactions which compete with each other, namely splitting of the dimers and polymerisation, can then be adjusted to one another at the selected reaction temperature and the suitable solvent so that the end products are distinguished by a relatively high content of free isocyanate groups with a very low content of volatile monomeric isocyanates.

The quantity of catalyst required depends on the activity of the catalyst, the nature of the dimer and the solvent used. In general, the quantity of catalyst required will be of the order of magnitude of 0.01 to 10% of the dimer. About 0.1 to 1% will be sufficient when highly active catalysts are used.

The reaction temperature may also be varied considerably. With a number of phosphines, the reaction proceeds sufficiently rapidly even at room temperature, but in other instances temperatures below about 150° C., preferably below about 100° C., are employed.

Any suitable solvent may be used to carry out the process of this invention such as, for example, esters including methyl acetate, ethyl acetate, butyl acetate, methyl glycol acetate, ethyl glycol acetate; ketones such as acetone, methyl ethyl ketone, diethyl ketone or cyclohexanone; benzene hydrocarbons and a number of chlorine-containing hydrocarbons such as chloroform and chlorobenzene. In these solvents, the products of this process are easily soluble. The said products are nonvolatile, solid substances which, have free NCO groups, and which, in contradistinction to the uretidones used as starting materials, are easily soluble in a large number of organic solvents even when cold.

Should it be so desired, however, the process of this invention may also be carried out in any suitable solvent in which the product of this process is further treated or reacted. For example, such further treatment or reaction may be the fabrication of a polyurethane lacquer, elastomer or foam in which the high molecular weight polymer product of this process is reacted with a compound containing at least two active hydrogen containing groups as determined by the Zerewitinoff method. In such cases, the fabrication of a lacquer will dictate the choice of solvent as will the fabrication of the elastomer and the form. Alternatively, the reaction may be carried out in any suitable solvent in which it is not desired to further process the end product, which solvent is then distilled off on completion of the polymerization reaction. The reaction product remaining behind may be dissolved in a different solvent to produce a solution of required viscosity and isocyanate content.

The polymerization reaction of the dimers may be stopped at any point depending on which free isocyanato groups content is required. Any suitable reagent which inactivates the catalyst and breaks off the reaction may be used. All compounds which can quaternate the tertiary phosphine catalyst are suitable, and preferably alkylating agents such as dimethyl sulphate, or toluene sulphonic acid methyl ester and acylating agents such as benzoyl chloride or N-phenyl-N-methyl-carbamidic acid chloride are employed.

The presence of isocyanurate groups in the high molecular weight polymer made by the process of this invention may be demonstrated by the presence in the infra-red spectrum thereof of well-defined absorption bands of 5.85 and 7.08 microns, the optical densities of which increase with the degree of polymerization. These bands are typical of isocyanurate structures, whereas dimeric forms of isocyanate polymers have absorption bands at 5.60 and 7.18 microns. Furthermore, the titratable isocyanate content and molecular weight determinations indicate end products containing varying quantities of high molecular weight components in which two or more cyanurate rings are contained in one molecule.

Instead of using the products of this invention in their pure forms or in the form of products containing the solvent, they may be converted into "split compounds," i.e., their reaction products with phenols, acetic acid esters, malonic acid esters, diphenylamino derivatives or hydrogen cyanide. At elevated temperatures, these split compounds behave like the free isocyanates and may advantageously be used wherever long standing periods are required in two-component lacquer solutions in the presence of compounds which contain hydroxyl groups, e.g., polyesters or polyethers.

The products of this process which require no further purification by extraction or distillation are suitable for use as adhesives and as hardening agents for resins. They are further expeditiously employed in the fabrication in polyether and polyester lacquers and for the production of elastomers and foamed polyurethane products.

The following examples are given for purposes of illustration and not limitation. All parts are specified by weight unless otherwise indicated.

EXAMPLE 1

About 175 parts of crude 3,3'-diisocyanato-4,4'-dimethyldiphenyluretdione containing about 0.4 part of unbound toluylene-2,4-diisocyanate are suspended in about 175 parts of anhydrous chlorobenzene. After heating the mixture to about 80° C., about 2 parts of tri-n-butylphosphine are added while stirring. The suspension is completely dissolved after about 10 to about 15 minutes. It is stirred for about 6 hours at about 80° C. and then left to stand for another about 16 hours at room temperature. The product then has an NCO value of about 8.5 percent and contains about 0.7 percent of volatile toluylene-2,4-diisocyanate. The viscosity is approximately 2200 cps./20° C.

To complete the reaction and to stabilise the NCO content and the viscosity, the product is stirred for another about 15 minutes at about 50° C. with the addition of about 4 parts of toluene sulphonic acid methyl ester.

EXAMPLE 2

About 250 parts of crude 3,3'-diisocyanato-4,4'-dimethyldiphenyluretdione are suspended in about 250 parts of anhydrous chlorobenzene and kept in a drying cupboard at about 30° C. after the addition of about 2.5 parts of tri-n-butyl phosphine. It is advisable to shake the mixture initially as required. After about 24 hours the mixture has gone into solution and after a total of about 48 hours the highly viscous solution has an NCO value of 7.1 percent and a content of unbound toluylene-2,4-diisocyanate of about 1.1 percent.

EXAMPLE 3

About 250 parts of crude 3,3'-diisocyanato-4,4'-dimethyldiphenyluretdione are suspended in about 250 parts of anhydrous ethyl acetate and heated to about 70° C. The mixture goes completely into solution about 10 to 15 minutes after the addition of about 2.5 parts of tri-n-butylphosphine and the reduction in the content of titratable isocyanate groups can be followed analytically. The mixture is stirred for about 6½ hours at about 70° C. and left to stand for about 16 hours at room temperature, and the reaction is stopped by the addition of about 6 parts of N-phenyl-N-methylcarbamidic acid chloride. The mixture contains about 7.9 percent of NCO and about 0.75 percent of unbound toluylene diisocyanate and has a viscosity of about 90 cps./20° C.

EXAMPLE 4

About 120 parts of 3,3'-diisocyanato-4,4'-dimethyl-diphenyluretdione (melting point about 160°) are suspended in 120 parts of anhydrous ethyl acetate and kept while stirring at about 50° C. after addition of about 2.4 parts of tri-n-butylphosphine and about 2.4 parts of pentamethyldiethylene triamine. After about two hours the suspension has gone into solution and after about eight hours the solution has an NCO content of about 8.6 parts. By adding of about 7 parts of dimethyl sulphate and short heating to about 80° C. the reaction is stopped. The yellow viscous solution has a content of monomeric toluylene diisocyanate of about 0.4 percent.

EXAMPLE 5

About 80 parts of 3,3'-diisocyanato-4,4'-dimethyl-diphenyluretdione (melting point about 160°) are suspended in about 120 parts of anhydrous ethyl acetate and stirred at about 70 to 80° C. after addition of about 0.8 part of dimethyl phenyl phosphine. After about six days the mixture has an NCO content of about 9.2 percent. The polymerisation is stopped by adding of about 0.8 part of anhydrous finely powdered aluminum chloride and short heating to about 80° C. The yellow solution shows a content of monomeric toluylene diisocyanate of about 0.9 percent.

Although the invention has been described in considerable detail for the purpose of illustration, it is to be understood that variations can be made therein by those skilled in the art without departing from the spirit of the invention and the scope of the claims.

I claim:

1. A process for the preparation of polyisocyanurates which are soluble in organic solvents and which are essentially free from monomeric isocyanates which comprises heating a 3,3'-diisocyanato-4,4'-dimethyl diphenyluretdione as essentially the sole starting reactant with a catalytic amount of an aliphatic tertiary phosphine at a temperature below about 150° C.

2. The process of claim 1 wherein said aliphatic tertiary phosphine catalyst is tri-n-butyl phosphine.

3. The process of claim 1 wherein the process is carried out at a temperature below 100° C.

4. The process of claim 1 wherein from about 0.01 to 10% by weight of said catalyst is used.

5. The process of claim 1 wherein from about 0.1 to 1% by weight of said catalyst is used.

References Cited

UNITED STATES PATENTS

| | | | |
|---|---|---|---|
| 2,671,082 | 3/1954 | Stallman | 260—239 |
| 2,683,144 | 7/1954 | Balon et al. | 260—239 |
| 3,206,352 | 9/1965 | Gollis et al. | 161—93 |
| 3,211,703 | 10/1965 | Gilman | 260—77.5 |

FOREIGN PATENTS

| | | |
|---|---|---|
| 856,372 | 12/1960 | Great Britain. |
| 790,209 | 2/1958 | Great Britain. |

OTHER REFERENCES

Frentzel, W.: Ber 21, pp. 411–413 (1888).

Saunders et al.: Polyurethanes, Part I, pp. 91–97 (1962).

DONALD E. CZAJA, *Primary Examiner.*

F. McKELVEY, *Assistant Examiner.*